United States Patent [19]

Scheidler

[11] 4,224,562

[45] Sep. 23, 1980

[54] VOLTAGE REGULATOR WITH ELECTRICALLY ISOLATED OUTPUT STAGE

[75] Inventor: Ralph E. Scheidler, Portland, Oreg.

[73] Assignee: Sure Power Products, Inc., Portland, Oreg.

[21] Appl. No.: 881,397

[22] Filed: Feb. 27, 1978

[51] Int. Cl.$^3$ .............................................. H02P 9/26
[52] U.S. Cl. ....................................... 322/26; 322/28; 322/73
[58] Field of Search ...................... 323/21; 322/28, 59, 322/72, 90, 73, DIG. 4, 26

[56] References Cited

U.S. PATENT DOCUMENTS

| 3,588,663 | 6/1971 | Hirata | 322/28 X |
| 3,599,079 | 8/1971 | Ansbro et al. | 322/28 X |
| 4,101,808 | 7/1978 | Flint | 323/21 X |

FOREIGN PATENT DOCUMENTS 426271 4/1935 United Kingdom ...................... 322/73

OTHER PUBLICATIONS

Instruments and Control Systems Magazine, Dec. 1972, p. 48.

Electronics, Feb. 21, 1974, p. 100, "IC Timer... Voltage Regulator," Fusar.

Primary Examiner—Robert J. Hickey
Attorney, Agent, or Firm—Oliver D. Olson

[57] ABSTRACT

The voltage regulator includes a voltage regulation electric circuit stage, an output electric circuit stage and an optic coupler connecting but electrically isolating said stages. The input of the voltage regulation stage is connected to a battery and/or directly or indirectly to the power output terminal of a direct current alternator or generator and the output of the voltage regulation stage is connected to the light emitting diode of the optic coupler the phototransistor of which is connected to a transistor switch in the output electric circuit stage which functions to connect the field windings of the alternator or generator to the same battery or to another battery in series with said battery, and/or to the power output terminal of the alternator or generator. When employed with series-connected batteries and the dual voltage control described in applicant's earlier U.S. Pat. No. 4,041,363 the input of an electronic on-off timer may be connected across the lower voltage battery of the series with the output of the timer connected to the voltage regulation stage to turn the latter on and off a predetermined timed sequence.

15 Claims, 3 Drawing Figures

VOLTAGE REGULATOR WITH ELECTRICALLY ISOLATED OUTPUT STAGE

BACKGROUND OF THE INVENTION

This invention relates to voltage regulators, more particularly to a voltage regulator having an output stage isolated electrically from the regulator stage, and specifically to a voltage regulator for use with series-connected batteries connected to a direct current alternator or generator which provides the same potential as the higher voltage battery of the series and wherein the voltage regulator regulates on the voltage of the lower voltage battery of the series.

Voltage regulators of the type heretofore employed in vehicles have been characterized by certain disadvantages and limitations. Their ground-connecting lead is susceptible of breaking, whereupon the regulator goes out of control. Their output is biased "on", and therefore when the sensing voltage lead is broken, as occurs occasionally, the regulator goes out of control. Further, being biased "on" the regulator operates at elevated temperatures which require more power for control. Their output is not isolated from the regulator stage, whereupon switching of the fields produces undesirable transient signals which, unless filtered out, result in erratic operation of the regulator.

Dual voltage electrical systems are finding increased utility on vehicles, boats and other industrial equipment, because of the availability of diverse sophisticated battery powered devices of diverse voltage requirements.

As an illustration, some industrial equipment is provided with a 24 volt direct current electrical system and yet it requires some 12 volt direct current load, such as a radio or a transceiver.

Such dual voltage systems may be provided conveniently and economically by an arrangement of series-connected 12 volt batteries. Because of the unbalanced battery load, separate regulated charge control is required for each battery. Applicant's earlier U.S. Pat. No. 4,041,363 provides such dual voltage control and maintains battery balance. However, it is a requirement that the alternator must be of the same voltage as the battery of the lower voltage output, since the alternator regulator must regulate the lower output voltage battery of the series while the dual voltage control regulates the higher voltage output battery of the series.

On the other hand, it is becoming an ever-increasing problem that certain types of industrial equipment are provided with a 24 volt electrical system, including a 24 volt alternator. Thus, in providing an additional 12 volt source, there has been no alternative heretofore to the extremely costly replacement of the 24 volt alternator with a 12 volt alternator. Indeed, certain systems have been impossible of such modification because of requirements of special housings and other components.

SUMMARY OF THE INVENTION

In its basic concept, this invention provides a voltage regulator in which the voltage regulation stage is isolated electrically from the output stage, whereby the regulator regulates on one voltage and delivers the same or any other voltage to the field windings of a direct current alternator or generator.

It is by virtue of the foregoing basic concept that the principal objective of this invention is achieved; namely, to overcome the aforementioned disadvantages and limitations of prior voltage regulators.

Another important objective of this invention is the provision of a voltage regulator of the class described which may be utilized to regulate a single voltage to a companion alternator or generator smoothly and precisely because the output stage electrically isolates the regulator from the otherwise adverse effects resulting from the collapsing field of the alternator or generator and other extraneous voltage surges or transient spikes that generally occur in conventional direct current generating systems.

Still another important objective of this invention is the provision of a voltage regulator of the class described which is characterized by providing a zero drain condition when the regulator is disconnected from its battery source, as when the ignition switch of an associated vehicle is turned off.

A further objective of this invention is the provision of a voltage regulator of the class described which provides for automatic shut-down of the regulating system in the event the sensing voltage is lost or the ground circuit is opened.

A still further important objective of this invention is the provision of a voltage regulator of the class described for use with applicant's dual voltage control described in U.S. Pat. No. 4,041,363 and which incorporates a timer to effect turning off the alternator field supply for predetermined intervals of time to allow unlatching of the dual voltage control and thus intermittently reestablish the higher voltage charge.

A still further important objective of this invention is the provision of a voltage regulator of the class described which is of simplified and rugged construction for economical manufacture and long service life with minimum maintenance.

The foregoing and other objects and advantages of this invention will appear from the following detailed description, taken in connection with the accompanying drawings of preferred embodiments.

DESCRIPTION OF THE PREFERRED EMBODIMENTS

Figure 1:
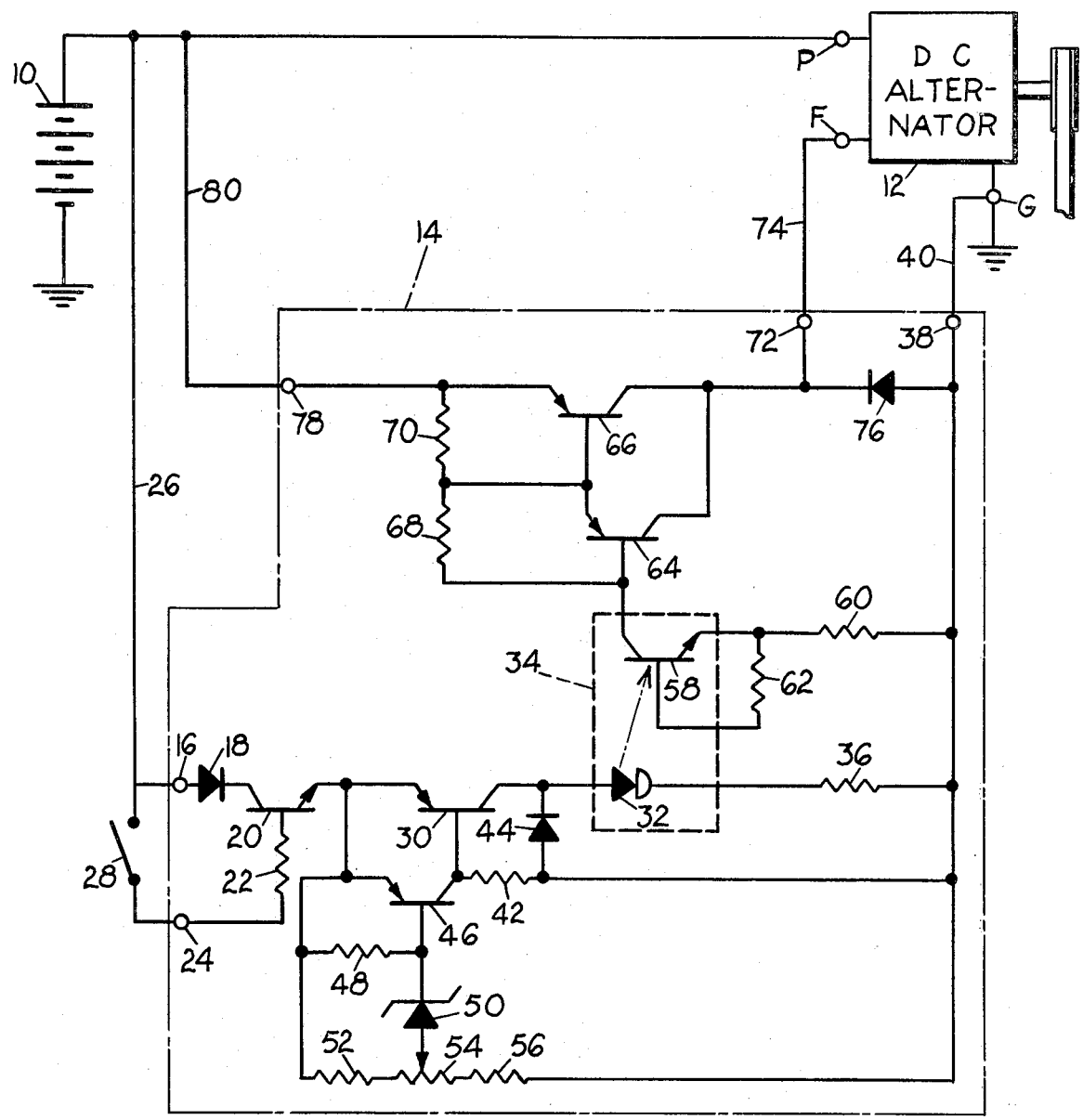
FIG. 1 is a schematic electrical diagram showing associated with a single battery and conventional direct current alternator, a voltage regulator embodying the features of this invention.

As previously mentioned, the voltage regulator of this invention may be utilized to advantage in place of a conventional regulator, for the regulation of a single battery with companion alternator or generator. Such an arrangement is illustrated in FIG. 1 of the drawings. The negative terminal of battery 10 is connected to common ground and the positive terminal of the battery is connected to the power output terminal P of a conventional direct current alternator 12. The alternator is mechanically activated by a vehicle or other drive engine, as by coupling thereto through a belt and pulley arrangement, as will be understood. It will be appreciated that the alternator may be replaced by a conventional generator, and therefore the term "generator" or "generating means" as employed in the claims is intended to include both generators and alternators. The alternator illustrated is provided with a ground terminal G for connection to common ground and a field terminal F for connection of power from the voltage regulator to the field windings of the alternator or generator.

It will be understood that the common ground connections may be replaced with a common negative connection insulated from common ground.

As illustrated, the voltage regulator assembly is confined within a housing, designated by the broken line 14. The voltage regulation electric circuit stage has an input terminal 16 on the housing connected through a diode rectifier 18 to the collector of a transistor 20 the base of which is connected through a current limiting resistor 22 to an input control terminal 24. As illustrated, the input terminal 16 is adapted to be connected, through an electrical conductor 26, to the positive terminal of the battery 10, and a control switch 28 releasably connects the conductor 26 to the input control terminal 24. This control switch may, for example, be the ignition switch of a vehicle. Alternatively, it may be mounted on the housing 14.

The emitter of transistor 20 is connected to the emitter of transistor 30 which is normally "on" when the control switch 28 is closed. The collector of transistor 30 is connected through the light emitting diode 32 of optic coupler 34 and current limiting resistor 36 to the common ground terminal 38 on the housing. This terminal is adapted to be connected through an electrical conductor 40 to the ground terminal G of the alternator 12.

The regulator also includes a biasing resistor 42 and diode 44, the normally "off" regulated transistor 46 with base-emitter resistor 48, zener diode 50 and voltage divider resistors 52, 54 and 56.

The optic coupler 34, exemplified by model MOC 1000 of Motorola, Inc., includes a phototransistor section 58. The emitter of the photo transistor is connected through the current limiting resistor 60 to the ground terminal 38, and the base-emitter resistor 62 serves to insure positive turn-off of the optic coupler. The collector of the transistor is connected to the base of control transistor 64 the emitter of which is connected to the base of output transistor 66. These transistors are provided with base-emitter resistors 68 and 70, respectively.

The collector of the output transistor 66 is connected to the field terminal 72 on the housing and this terminal is adapted to be connected, through an electrical conductor 74, to the field terminal F of the alternator 12. The free wheeling diode 76 connected between the field and ground terminals functions to dissipate reverse voltage spikes induced by the collapsing field of the alternator. The emitter of the output transistor 66 is connected to the input terminal 78 on the housing and this terminal is adapted for connection, through an electrical conductor 80, to the positive terminal of the battery 10.

The operation of the voltage regulator illustrated in FIG. 1, is as follows: Upon closure of the control switch 28, activation of the transistor 20 provides turn-on power for the regulator, the base resistor 22 limiting the turn-on current. This turns on the transistor 30, thereby applying positive power to the light emitting diode section 32 of the optic coupler, through the current limiting resistor 36.

Light emitted from the light emitting diode activates the phototransistor section 58 of the optic coupler which, in turn, activates the control transistor 64 to effect activation of the output transistor 66. Positive power from the positive terminal of the battery 10 thereupon is delivered through the output transistor 66 to the field terminal F of the alternator. Energization of the alternator field causes the alternator to produce voltage at the power output terminal P.

When the voltage across the battery 10 reaches a predetermined value, as determined by the adjustment of the voltage divider resistor 54, the zener diode 50 fires and turns on the transistor 46 which is held normally "off" by the resistor 48. Activation of the transistor 46 turns off the transistor 30, thereby deactivating the light-emitting diode 32 and its associated phototransistor 58. The output switching transistors 64 and 66 thus also are turned off. Deactivation of the output transistor switch 66 opens the circuit of the alternator field windings, thereby stopping the alternator charge.

When the voltage across the battery 10 drops below a predetermine value, the zener diode 50 turns off, reestablishing the normal "on" condition of the transistor 30, the optic coupler 34 and the output switching transistor 66, thereby reenergizing the alternator field and causing the alternator to resume charging.

The foregoing sequence of switching the alternator field on and off is very rapid, normally ranging from about 200 to about 1,000 times per second.

Figure 2:
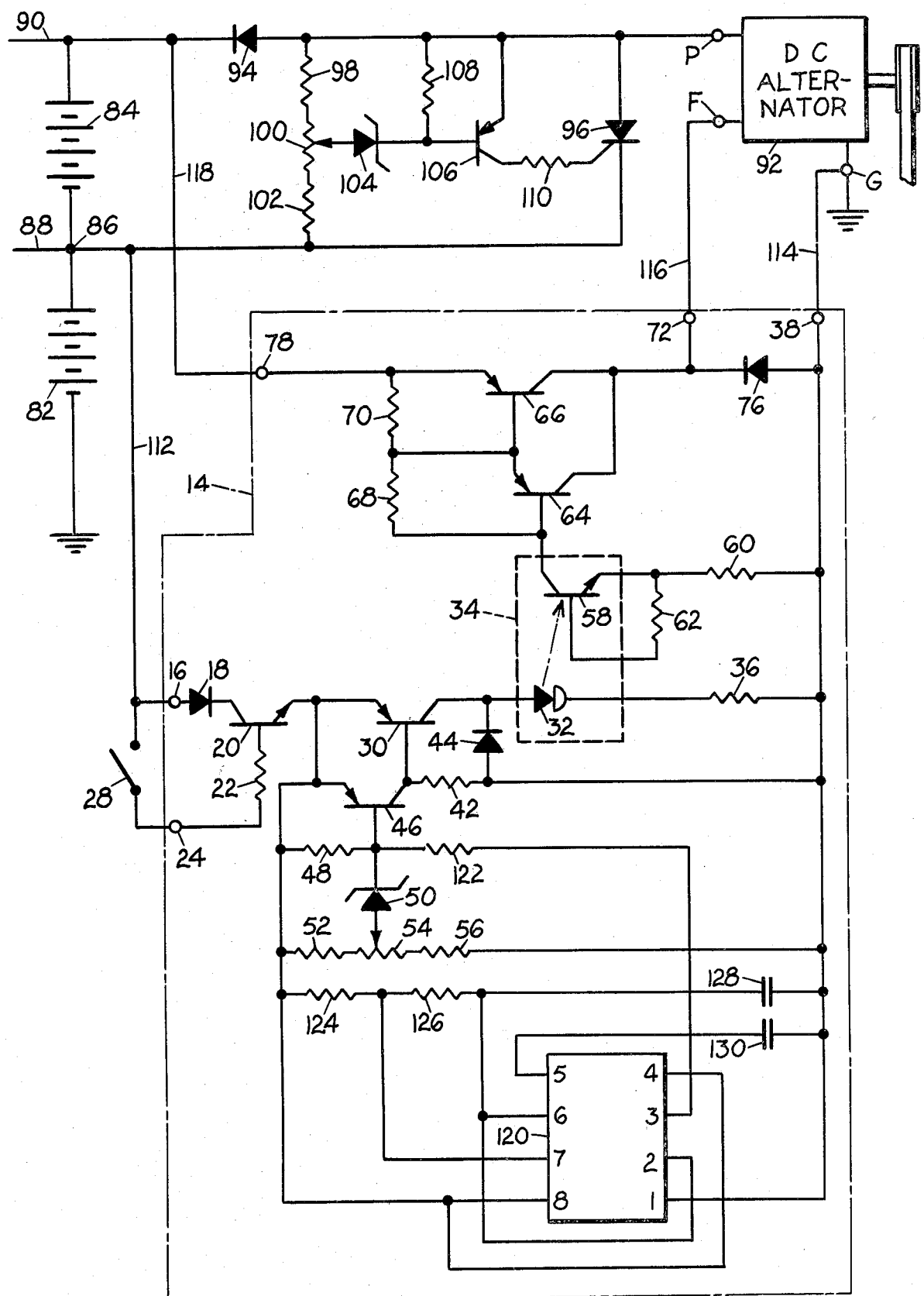
FIG. 2 is a schematic electrical diagram showing associated with a system of series-connected batteries and a conventional direct current alternator and the dual voltage control of applicant's earlier patent, a voltage regulator embodying the features of this invention.

Referring now to FIG. 2 of the drawings, two batteries 82 and 84 are shown connected together in series. The negative terminal of battery 82 is connected to common ground and the positive terminal of said battery and the negative terminal of battery 84 are connected together at a common junction 86. An electrical conductor 88 extends from this junction to supply an electrical system with a lower voltage output from the battery 82. The positive terminal of battery 84 is connected to an electrical conductor 90 which supplies an electrical system with the higher voltage output provided by the series-connected batteries. Thus, for example, with each battery providing a twelve volt output, the conductor 88 provides twelve volts to an electrical system, while the conductor 90 provides twenty-four volts to another electrical system.

FIG. 2 also illustrates a conventional direct current alternator 92 which, like alternator 12 described hereinbefore, is mechanically activated by a vehicle or other drive engine, as by coupling thereto through a belt and pulley arrangement. The output of the alternator may be any magnitude desired. Thus, in the foregoing example, it may have an output of twelve or twenty-four volts.

The power output terminal P of the alternator 92 is connected to the positive terminal of battery 84 through an uncontrolled diode 94 which functions, upon attainment of a predetermined voltage at the output terminal, to conduct charging current to the positive terminal of battery 84, thence through both batteries to common ground.

In accordance with applicant's earlier patent, identified hereinbefore, means is provided for switching the output terminal P of the alternator to the common junction 86 upon attainment of a predetermined voltage drop across the battery 84 providing the higher voltage output, whereby to direct charging current only to the battery 82 providing the lower voltage output. Briefly, this is provided by an electrically actuated switch, in the form of the silicon controlled rectifier 96 which interconnects the power output terminal P of the alternator and the common junction 86 between the batteries. The silicon controlled rectifier is normally off, and hence the switch is normally open.

The electrical actuator for the switch 96 includes the voltage detecting resistors 98, 100 and 102, the zener diode 104, the transistor 106 which is biased normally off by resistor 108, and the resistor 110 which interconnects the transistor collector and the control electrode of the silicon controlled rectifier 96.

As explained hereinbefore, the use of applicant's above described dual voltage control heretofore has required that the direct current alternator or generator be of the same voltage as the battery providing the lower voltage output, because of the limitations of conventional voltage regulators incorporated therewith. However, the voltage regulator of this invention allows the direct current alternator or generator to be companion to the higher voltage output of the series-connected battery system. Thus, in the foregoing illustration wherein the batteries 82 and 84 are twelve volt batteries, the alternator may be either a twelve volt or twenty-four volt alternator.

As illustrated in FIG. 2, the voltage regulator described hereinbefore is associated with the dual battery assembly as follows: The input terminal 16 and control switch 28 are connected through the electrical conductor 112 to the junction 86 between the series-connected batteries, the ground terminal 38 is connected through a conductor 114 to the ground terminal G on the alternator, the field terminal 72 is connected through a conductor 116 to the field terminal F on the alternator, and the input terminal 78 is connected through a conductor 118 to the positive terminal of the battery 84 providing the higher voltage output.

The operation of the voltage regulator, in association with the dual voltage system illustrated in FIG. 2, is as follows: Upon closure of the control switch 28, activation of the transistor 20 turns on the transistor 30, thereby applying positive power to the light emitting diode section 32 of the optic coupler. Light emitted from the light emitting diode activates the phototransistor section 58 of the optic coupler which, in turn, effects activation of the output transistor 66. Positive power from the positive terminal of the higher voltage output battery 84 thereupon is delivered through the output transistor 66 to the field terminal F of the alternator. Energization of the alternator field causes the alternator to produce voltage at the power output terminal P.

When the voltage across the lower voltage battery 82 reaches a predetermined value, as determined by the adjustment of the voltage divider resistor 54, the zener diode 50 fires and turns on the transistor 46 which is held normally "off" by the resistor 48. Activation of the transistor 46 turns off the transistor 30, thereby deactivating the light-emitting diode 32 and its associated phototransistor 58. The output switching transistors 64 and 66 thus also are turned off. Deactivation of the output transistor switch 66 opens the circuit of the alternator field windings, thereby stopping the alternator charge.

When the voltage across the lower voltage battery 82 drops below a predetermined value, the zener diode 50 turns off, reestablishing the normal "on" condition of the transistor 30, the optic coupler 34 and the output switching transistor 66, thereby reenergizing the alternator field and causing the alternator to resume charging.

As previously explained, power output terminal P of the alternator 92 is connected to the positive terminal of the higher voltage output battery 84 through the uncontrolled diode 94. This diode functions, upon attainment of a predetermined voltage at the output terminal, to conduct charging current to the positive terminal of the battery 84, thence through both batteries to common ground. Both batteries thus are charged.

In accordance with applicant's earlier patent, referred to hereinbefore, when the voltage across the higher voltage battery 84 reaches a predetermined value, as sensed by the resistors 98, 100 and 102, the zener diode 104 is caused to fire, turning on the transistor 106 which effects activation of the silicon controlled rectifier 96. Charging current thus is directed from the output terminal P of the alternator 92 to the common junction 86. Since the voltage at the output terminal drops to a predetermined value lower than the voltage at the positive terminal of the higher voltage output battery 84, the diode 94 ceases to conduct. Charging current through the higher voltage output battery 84 thus is stopped, and the charging current thereupon is directed through the activated silicon controlled rectifier 96 to the common junction 86 to continue charging the lower voltage output battery 82. This occurs because, although the voltage at the base of the transistor 106 drops to turn the latter off, thereby removing the control signal from the gate of the silicon controlled rectifier, the latter is conducting direct current and therefore continue in its activated state.

In applicant's earlier patent, deactivation of the silicon controlled rectifier 96 is effected when the voltage across the higher voltage output battery 84 drops and deactivates the output of the conventional voltage regulator, thereby stopping the output of the alternator 92 and deactivating the silicon controlled rectifier 96. In accordance with this invention, on the other hand, means may be provided for turning off the alternator field supply on a predetermined time cycle, rather than in response to a drop in voltage at the higher voltage output battery 84. The sequencing of the alternator field on a timed cycle has utility in the present illustration because of the requirement of the continuous higher voltage load and the consequent need for frequent periodic recharging of the higher voltage output battery.

Thus, referring to FIG. 2, the integrated circuit 120 includes a timer module and comparator circuit. It is connected across the lower voltage output battery 82 and its output is connected through current limiting resistor 122 to the base of transistor 46. Typical of this integrated circuit is model SE 555 of Signetics, Inc. or NE 555 of National Semiconductor Corp.

With the closing of the control switch 28 the timer module of the integrated circuit is energized and the timing circuit composed of resistors 124 and 126 and capacitors 128 and 130, together with the comparator circuit in the integrated circuit, begin their timed charge. At a predetermined time the integrated circuit fires and delivers a turn-on signal to the base of transistor 46 through the current limiting resistor 122. This turn-on signal causes the transistor 30, optic coupler 34 and output switching transistor 66 to turn off and completely stop the alternator charge. At the end of the predetermined time period, the integrated circuit module sinks, relinquishing control of the voltage divider and zener diode circuit to reactivate the alternator.

The purpose of this function is to interrupt the alternator charge long enough to allow the silicon control rectifier 96 to unlatch and reestablish charging through the series-connected batteries. Although the sequencing time is variable over wide limits, it has been found that for the present illustration a suitable sequence cycle is about forty-five seconds charging of the batteries and a two second interruption of charging to effect unlatching of the silicon controlled rectifier. Either of these times may be varied from a fraction of a second to several hours, as required. This timing function re-establishes charge through the series-connected batteries for the time required for the higher voltage output battery 84 to become fully charged. This time may vary from a fraction of a second to several hours, depending upon the amount of the continuous higher voltage load and the ratio between the higher voltage load and lower voltage load.

It will be apparent that the foregoing timer stage may be omitted, as when the higher voltage circuit is employed to a much lesser extent than the lower voltage circuit, as explained in applicant's earlier patent preferred to hereinbefore.

Figure 3:
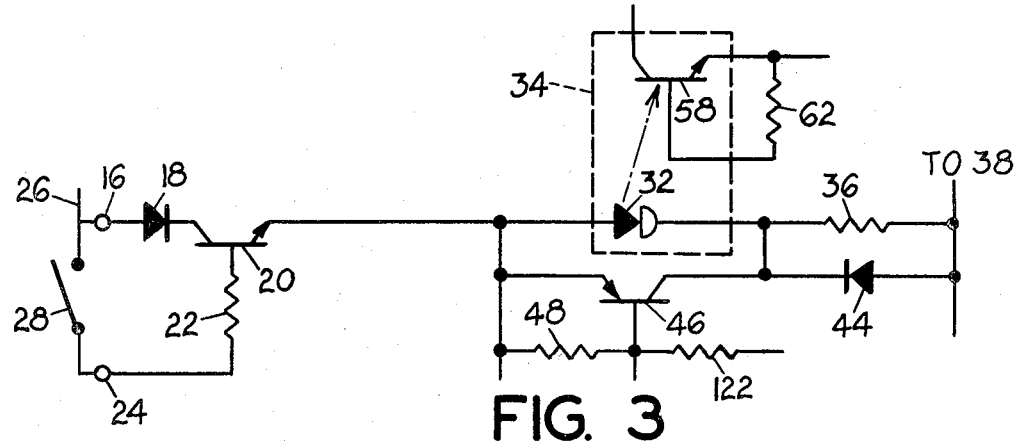
FIG. 3 is a fragmentary schematic electrical diagram showing a modified control for the light emitting diode component of the optic coupler.

In the modification illustrated in FIG. 3, the normally "off" regulated transistor 46 is connected across the light emitting diode section 32 of the optic coupler and functions, upon activation, to bypass the light emitting diode and turn the latter off. This arrangement eliminates the transistor 30 and biasing resistor 42 illustrated in FIGS. 1 and 2.

From the foregoing, it will be appreciated that the present invention provides a voltage regulator of simplified and rugged, solid state construction for economical manufacture and long service life. It is versatile in its application to a wide variety of direct current generating systems, from conventional single voltage systems to those providing dual output voltages and associated with alternators or generators companion to either the lower or higher output voltage.

The regulator of this invention provides the further advantage in that the output electric current stage is normally off and is turned on by means of the optic coupler 34 which is powered by the input of the regulation stage. Turning off the optic circuit by means of the transistor 30 or 46 completely turns off the regulator, providing for a zero drain condition when the switch 28 is open. In contrast, conventional voltage regulators provided heretofore are normally on and thus subject to continual drain.

The regulator of this invention also avoids the costly addition of the usual filtering components required for conventional voltage regulators. Further, the regulator of this invention and the electric components associated with it are protected against damage, by automatic shutdown of the regulator in the event the sensing voltage for the regulator is lost or the ground connection opened, as by inadvertent breakage or other disconnection of the electrical conductors 26, 112 or 40, 114.

The regulator of this invention may be provided to regulate in either a positive or negative ground system, and in either the positive or negative field supply circuit.

It will be apparent to those skilled in the art that various changes may be made in the type, number and arrangement of components described hereinbefore, without departing from the spirit of this invention.

Having now described my invention and the manner in which it may be used, I claim:

1. A voltage regulator for electric generating means providing a direct current output, comprising:
    (a) a voltage regulation electric circuit stage having a regulated output and a direct current input adapted for connection to the direct current output of the generating means,
    (b) an output electric circuit stage adapted for connection at one end to the field windings of the generating means and at the opposite end to a source of direct current, and
    (c) an optic coupler having an electrically actuated light source connected to the output of the regulation stage and light actuated electric switch means in the output electric circuit stage for opening and closing said circuit.

2. The voltage regulator of claim 1 wherein the input of the voltage regulation electric circuit stage includes an electrically actuated switch and an electric actuator for the switch arranged for releasable connection to a source of electric potential.

3. The voltage regulator of claim 2 wherein the electrically actuated switch includes the collector-emitter of a transistor and the electric actuator therefor includes the base-emitter of said transistor.

4. The voltage regulator of claim 3 including an electric switch releasably connecting the base of said transistor to the source of electric potential.

5. The voltage regulator of claim 1 wherein the light actuated electric switch means includes an electrically actuated switch in the output electric circuit stage, an electric actuator for the switch having an electric circuit, and a light actuated switch in said last named electric circuit.

6. The voltage regulator of claim 5 wherein the electrically actuated switch of the light actuated electric switch means includes the collector-emitter of a transistor, the electric actuator therefor includes the base-emitter of said transistor, and the light actuated switch includes a phototransistor component of an optic coupler the electrically actuated light source of which includes a light emitting diode.

7. The voltage regulator of claim 6 wherein the output electric circuit stage includes a first transistor the collector-emitter of which is adapted for connection at one end to the field windings of the generating means and at the opposite end to a source of direct current, and a second transistor the collector-emitter of which is connected across the base-collector of the first transistor, the base of the second transistor being connected to the collector-emitter of the phototransistor.

8. The voltage regulator of claim 1 wherein the voltage regulation electric stage includes:
    (a) a first transistor the collector-emitter of which interconnects the input and output and the base-emitter of which is adapted for connection across the output of the generating means,
    (b) a second transistor the collector-emitter of which interconnects the base-emitter of the first transistor and is adapted for connection across the output of the generating means,
    (c) a voltage divider adapted for connection across the output of the generating means, and
    (d) a zener diode interconnecting the voltage divider and the base of the second transistor and operable above a predetermined voltage to activate the second transistor and deactivate the first transistor to deactivate the optic coupler and deenergize the field of the generating means, and operable below said predetermined voltage to deactivate the second transistor and activate the first transistor to activate the optic coupler and energize the field of the generating means.

9. The voltage regulator of claim 1 wherein the voltage regulation electric circuit stage includes:
(a) a transistor the collector-emitter of which is connected across the light source of the optic coupler,
(b) a voltage divider adapted for connection across the output of the generating means, and
(c) a zener diode interconnecting the voltage divider and the base of the transistor and operable above a predetermined voltage to activate the transistor to deactivate the optic coupler and deenergize the field of the generating means, and operable below said predetermined voltage to deactivate the transistor to activate the optic coupler and energize the field of the generating means.

10. A voltage regulator for electric generating means providing a direct current output connected across a pair of batteries connected in series and with the power output terminal of the generating means connected to the junction between the pair of series-connected batteries releasably through a silicon controlled rectifier the control electrode of which is connected through a turn-on control circuit to the higher voltage output battery of the pair, the voltage regulator comprising:
(a) a voltage regulation electric circuit stage having a regulated output and a direct current input adapted for connection to the junction between the series-connected batteries,
(b) an output electric circuit stage adapted for connection at one end to the field windings of the generating means and at the opposite end to the higher voltage output battery, and
(c) an optic coupler having an electrically actuated light source connected to the output of the regulation stage and light actuated electric switch means in the output electric circuit stage for opening and closing said circuit.

11. The voltage regulator of claim 10 including electrically actuated timer means connected to the voltage regulation electric circuit stage for activating and deactivating the latter on a predetermined timed sequence, whereby intermittently to unlatch the silicon controlled rectifier and reestablish the higher voltage charge.

12. The voltage regulator of claim 11 wherein the voltage regulation electric circuit stage includes:
(a) a first transistor the collector-emitter of which interconnects the input and output and the base-emitter of which is adapted for connection across the lower voltage output battery of the pair,
(b) a second transistor the collector-emitter of which interconnects the base-emitter of the first transistor,
(c) a voltage divider adapted for connection across the lower voltage output battery of the pair, and
(d) a zener diode interconnecting the voltage divider and the base of the second transistor and operable above a predetermined voltage to activate the second transistor and deactivate the first transistor to deactivate the optic coupler and deenergize the field of the generating means, and operable below said predetermined voltage to deactivate the second transistor and activate the first transistor to activate the optic coupler and energize the field of the generating means,
(e) the electrically actuated timer means being connected across the regulation stage and having an electric signal output connected to the base of the second transistor.

13. The voltage regulator of claim 11 wherein the voltage regulation electric circuit stage includes:
(a) a transistor the collector-emitter of which is connected across the light source of the optic coupler,
(b) a voltage divider adapted for connection across the lower voltage output battery of the pair, and
(c) a zener diode interconnecting the voltage divider and the base of the transistor and operable above a predetermined voltage to activate the transistor to deactivate the optic coupler and deenergize the field of the generating means, and operable below said predetermined voltage to deactivate the transistor to activate the optic coupler and energize the field of the generating means,
(d) the electrically actuated timer means being connected across the regulation stage and having an electric signal output connected to the base of the transistor.

14. The voltage regulator of claim 10 wherein:
(a) the input of voltage regulation electric circuit stage includes the collector-emitter of a transistor switch and an electric switch releasably connecting the base of said transistor to the junction between the series-connected batteries,
(b) the light actuated electric switch means includes an electrically actuated switch in the output electric circuit stage, an electric actuator for the switch having an electric circuit, and a light actuated switch in said last named electric circuit, the electrically actuated switch of the light actuated electric switch means including the collector-emitter of a transistor, the electric actuator therefor includes the base-emitter of said transistor, and the light actuated switch including a photo-transistor component of an optic coupler the electrically actuated light source of which includes a light emitting diode,
(c) the output electric circuit stage includes a first transistor, the collector-emitter of which is adapted for connection at one end to the field windings of the generating means and at the opposite end to the higher voltage output battery, and a second transistor the collector-emitter of which is connected across the base-collector of the first transistor, the base of the second transistor being connected to the collector-emitter of the phototransistor, and
(d) electrically actuated timer means is connected to the voltage regulation electric circuit stage for activating and deactivating the latter on a predetermined timed sequence, whereby intermittently to unlatch the silicon controlled rectifier and reestablish the higher voltage charge.

15. A voltage regulator for electric generating means providing a direct current output connected across a battery, comprising:
(a) a voltage regulation electric circuit stage having a regulated output and a direct current input adapted for connection to one terminal of the battery,
(b) an output electric circuit stage adapted for connection at one end to the field windings of the generating means and at the opposite end to said one terminal of the battery, and
(c) an optic coupler having an electrically actuated light source connected to the output of the regulation stage and light actuated electric switch means in the output electric circuit stage for opening and closing said circuit.

* * * * *

UNITED STATES PATENT AND TRADEMARK OFFICE
CERTIFICATE OF CORRECTION

PATENT NO. : 4,224,562

DATED : 23 September 1980

INVENTOR(S) : Ralph E. Scheidler

It is certified that error appears in the above–identified patent and that said Letters Patent are hereby corrected as shown below:

Column 7, line 1, "sinks should read --turns off--;

Column 7, line 1, "of" should read --to--.

Signed and Sealed this

Eleventh Day of August 1981

[SEAL]

Attest:

GERALD J. MOSSINGHOFF

Attesting Officer

Commissioner of Patents and Trademarks